US011188712B2

(12) United States Patent
Lu et al.

(10) Patent No.: US 11,188,712 B2
(45) Date of Patent: Nov. 30, 2021

(54) SYSTEMS AND METHODS FOR WHOLESALE CLIENT ONBOARDING

(71) Applicant: JPMorgan Chase Bank, N.A., New York, NY (US)

(72) Inventors: Giang-Tze Lu, Leonia, NJ (US); Niladri Bhattacharya, Jersey City, NJ (US); Ray Wangneo, Wilton, CT (US); Sunil Nair, River Vale, NJ (US); Charlene C. Balfour, New York, NY (US); Maria Adriana Ciunga, Manasquan, NJ (US); Kundan Khanolkar, New York, NY (US); Abhijith Varma, Livingston, NJ (US); Paul Dorn, New York, NY (US); Dana Marie Dedge Parks, Apollo Beach, FL (US); Harsh Benara, Edison, NJ (US)

(73) Assignee: JPMorgan Chase Bank, N.A., New York, NY (US)

(*) Notice: Subject to any disclaimer, the term of this patent is extended or adjusted under 35 U.S.C. 154(b) by 17 days.

(21) Appl. No.: 16/288,947

(22) Filed: Feb. 28, 2019

(65) Prior Publication Data
US 2020/0279015 A1   Sep. 3, 2020

(51) Int. Cl.
*G06F 17/00* (2019.01)
*G06F 40/174* (2020.01)
(Continued)

(52) U.S. Cl.
CPC .......... *G06F 40/174* (2020.01); *G06F 16/258* (2019.01); *G06Q 10/067* (2013.01)

(58) Field of Classification Search
CPC ... G06F 40/174; G06F 16/258; G06Q 10/067; G06Q 20/4014; G06Q 20/405;
(Continued)

(56) References Cited

U.S. PATENT DOCUMENTS 9,805,213 B1    10/2017  Kragh
10,438,200 B1*  10/2019  Griffith ............. G06Q 20/4014
(Continued)

FOREIGN PATENT DOCUMENTS

| WO | 2016053975 A1 | 4/2016 |
| WO | 2018236401 A1 | 12/2018 |
| WO | 2019021311 A1 | 1/2019 |

OTHER PUBLICATIONS

Financial Industry Regulatory Authority (FINRA), Regulatory Notice: Know Your Customer and Suitability, Jan. 2011, pp. 1-13 (Year: 2011).*

(Continued)

*Primary Examiner* — Jason T Edwards
(74) *Attorney, Agent, or Firm* — Hunton Andrews Kurth LLP

(57) ABSTRACT

Systems and methods for wholesale client onboarding are disclosed. In one embodiment, in an information processing apparatus comprising at least one computer processor, a method for client onboarding may include: (1) creating know your customer requirements and trigger conditions for a client based on user configurable requirements and a rules engine; (2) receiving know your customer data for the client from a client data exchange module; (3) triggering the receipt of additional know your customer data in response to a trigger condition being met by the received know your customer data; (4) receiving document data from a document digitization module; (5) validating the know your customer data and the document data; and (6) auto populating a know your customer record with the validated know your customer data and the document data.

18 Claims, 6 Drawing Sheets

(51) Int. Cl.
*G06Q 10/06* (2012.01)
*G06F 16/25* (2019.01)

(58) Field of Classification Search
CPC .............. G06Q 20/3829; G06Q 20/36; G06Q 2220/00; G06Q 20/381; G06Q 20/10; G06Q 20/0283; G06Q 40/04; G06Q 40/06; H04L 9/0643
USPC ........................................................ 715/226
See application file for complete search history.

(56) References Cited

U.S. PATENT DOCUMENTS

| | | | |
|---|---|---|---|
| 2007/0130042 A1* | 6/2007 | Dryden | G06Q 40/06 705/36 R |
| 2010/0228721 A1* | 9/2010 | Mok | G06F 16/25 707/711 |
| 2015/0154588 A1* | 6/2015 | Purves | G06Q 30/0641 705/14.27 |
| 2015/0317296 A1* | 11/2015 | Vohra | G06F 40/174 715/221 |
| 2016/0012031 A1* | 1/2016 | Narasimhan | H04L 51/046 715/224 |
| 2016/0283941 A1* | 9/2016 | Andrade | H04L 9/3247 |
| 2018/0205743 A1 | 7/2018 | McIver et al. | |
| 2019/0188790 A1* | 6/2019 | Lovato | G06Q 30/0283 |

OTHER PUBLICATIONS

Notification of Transmittal of the International Search Report and the Written Opinion of the International Searching in PCT/US20/18727 dated May 6, 2020.

\* cited by examiner

SYSTEMS AND METHODS FOR WHOLESALE CLIENT ONBOARDING

BACKGROUND OF THE INVENTION

1. Field of the Invention

The present disclosure generally relates to systems and methods for wholesale client onboarding.

2. Description of the Related Art

Regulations require financial institutions to know critical details about their clients. These clients are often large companies and banks that are performing wholesale business transactions globally. The basic requirements require financial institutions to substantiate that they know their customer, and these documents are often stored within a database or system.

SUMMARY OF THE INVENTION

Systems and methods for wholesale client onboarding are disclosed. In one embodiment, in an information processing apparatus comprising at least one computer processor, a method for client onboarding may include: (1) creating know your customer requirements and trigger conditions for a client based on user configurable requirements and a rules engine; (2) receiving know your customer data for the client from a client data exchange module; (3) triggering the receipt of additional know your customer data in response to a trigger condition being met by the received know your customer data; (4) receiving document data from a document digitization module; (5) validating the know your customer data and the document data; and (6) auto populating a know your customer record with the validated know your customer data and the document data.

In one embodiment, the method may further include identifying a gap in the know your customer data and the document data based on the know your client requirements.

In one embodiment, the step of creating know your customer requirements for the client based on user configurable requirements and a rules engine may include: receiving the know your customer requirements from a user interface; receiving a plurality of rules for the know your customer requirements; and receiving a modification of a country or product for one of the rules.

In one embodiment, the step of receiving the know your customer data from a client data exchange module may include: requesting the know your customer data from a source internal to the organization; and receiving and ingesting the know your customer data from the source internal to the organization.

In one embodiment, the know your customer data may include transaction data, and the method may further include aggregating the transaction data from an account level to a client level; and summarizing the aggregated transaction data at the client level.

In one embodiment, the step of receiving know your customer data from a client data exchange module may include: requesting the know your customer data from a source external to the organization; receiving the know your customer data from the source internal to the organization; and mapping the know your customer data to a standard format. In one embodiment, the standard format may be based on ISO country code or currency code.

In one embodiment, the step of receiving document data from a document digitization module may include: classifying a document comprising the document data as a structured document or an unstructured document; recognizing characters in the document using an optical character recognition engine; extracting content from descriptive text in the unstructured document or identifying content in the structured document; transforming the content into a document taxonomy; and updating a metadata repository with the transformed content.

In one embodiment, the method may further include generating a narrative text for the know your customer data and the document data. This may include: receiving an identification of a template for the narrative text; receiving customer due diligence field values; and generating text based on the templates and the customer due diligence field values.

In one embodiment, the method may further include performing a scoping call to identify required customer data to be captured for the know your customer requirements.

According to another embodiment, a system for client onboarding may include an electronic device comprising at least one computer processor and executing a client onboarding computer program; a user-configurable rules engine; a client data exchange module; a document digitization module; and a document repository. The client onboarding computer program may create know your customer requirements and trigger conditions for a client based on user configurable requirements from the user-configurable rules engine; may receive know your customer data for the client from the client data exchange module; may trigger the receipt of additional know your customer data in response to a trigger condition being met by the received know your customer data; may receive document data from the document digitization module; may validate the know your customer data and the document data; and may auto populate a know your customer record with the validated know your customer data and the document data.

In one embodiment, the client onboarding computer program may identify a gap in the know your customer data and the document data based on the know your client requirements.

In one embodiment, the client onboarding computer program may create the know your customer requirements for the client by receiving the know your customer requirements from a user interface, receiving a plurality of rules for the know your customer requirements, and receiving a modification of a country or product for one of the rules.

In one embodiment, the client onboarding computer program may receive the know your customer data from a client data exchange module by requesting the know your customer data from a source internal to the organization and receiving and ingesting the know your customer data from the source internal to the organization.

In one embodiment, the know your customer data may include transaction data, and the client onboarding computer program may aggregate the transaction data from an account level to a client level, and summarize the aggregated transaction data at the client level.

In one embodiment, the client onboarding computer program may receive the know your customer data from a client data exchange module by: requesting the know your customer data from a source external to the organization; receiving the know your customer data from the source internal to the organization; and mapping the know your customer data to a standard format.

In one embodiment, the standard format may be based on ISO country code or currency code.

In one embodiment, the client onboarding computer program may receive document data from a document digitization module by: classifying a document comprising the document data as a structured document or an unstructured document; recognizing characters in the document using an optical character recognition engine; extracting content from descriptive text in the unstructured document or identifying content in the structured document; transforming the content into a document taxonomy; and updating a metadata repository with the transformed content.

In one embodiment, the client onboarding computer program may further generate a narrative text for the know your customer data and the document data by: receiving an identification of a template for the narrative text; receiving customer due diligence field values; and generating text based on the templates and the customer due diligence field values.

In one embodiment, the client onboarding computer program may perform a scoping call to identify required customer data to be captured for the know your customer requirements.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for wholesale client onboarding.

Embodiments may provide some or all of the following technical advantages. population management, whereby clients and scheduling may be performed across multiple teams or business units within an organization; bulk processing, which may allow for changes to be made across the book of work; integration of data with market utilities and internal systems onto a client data exchange platform; the development of data science capabilities which may optimize the data integration and data aggregation back to the end user performing the recertification on the client; the delivery of due diligence software to bring offline procedures into a system and develop a mechanism to store that data consistently for each country with special regulations; the maintenance of audit-ready documentation; narrative generation, whereby natural language processing which enables sentences to be constructed and result in accurate summaries of the client's relationship.

Figure 1:
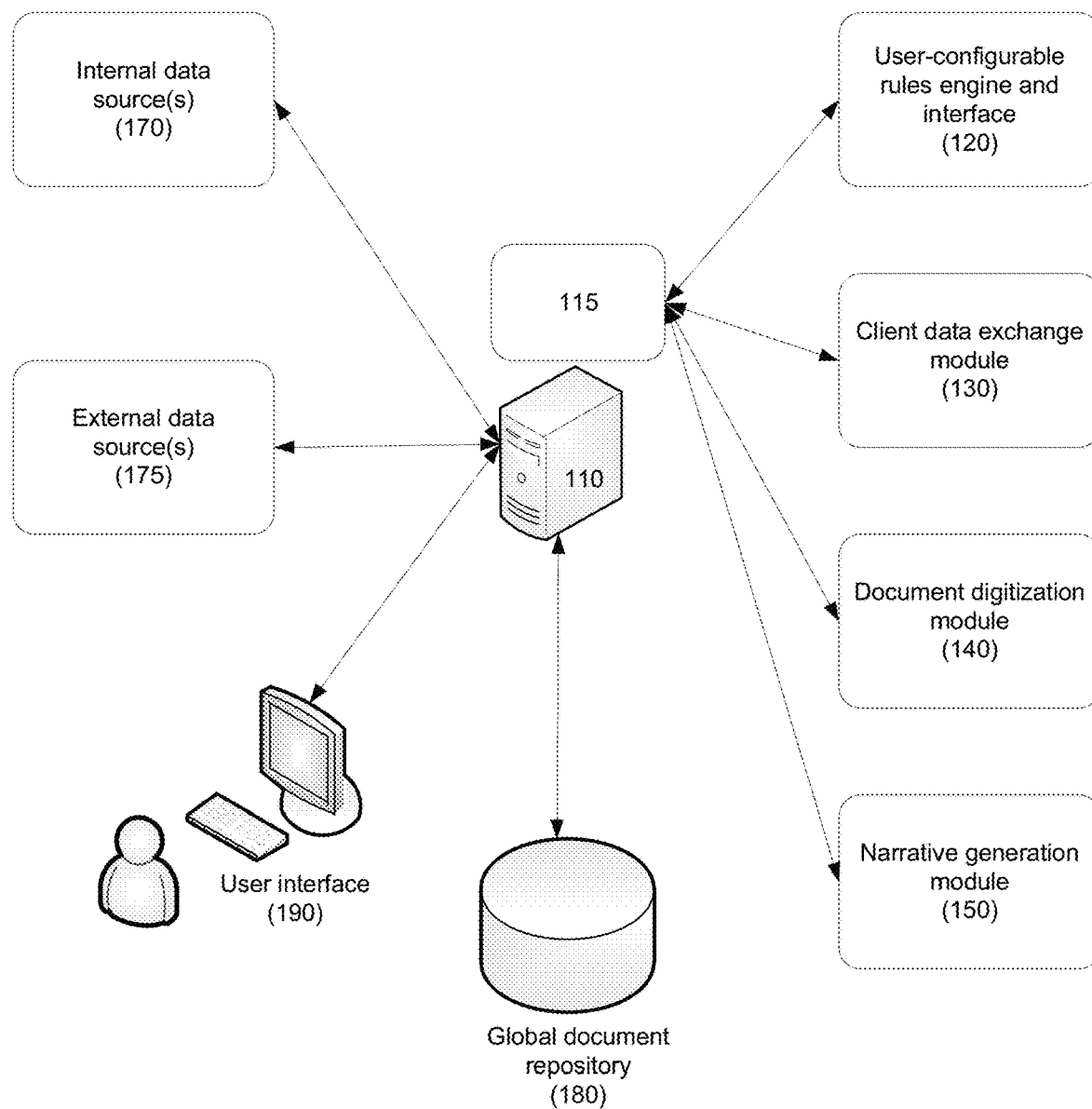
FIG. 1 depicts a system for wholesale client onboarding according to one embodiment.

Referring to FIG. 1, a system for wholesale client onboarding is disclosed according to one embodiment. System 100 may include server 110 that may execute computer program or application 115 for wholesale client onboarding.

System 100 may include user-configurable rules engine and dynamic user interface 120. Module 120 may be used to capture KYC requirements may be used. Module 120 may be deployed as one or more cloud-based micro services In one embodiment, the user-configurable rules engine and dynamic user interface module may include micro services for performing KYC requirements, such as customer due diligence, customer identification, local due diligence, enhanced due diligence, specialized due diligence, product due diligence and anti-money laundering (AML) risk. The user interface may be plugged into, or called, by any application that may will render the requirements for the data to collected.

The maintenance of the module may be user defined as the user may have access to add/modify requirements and configure the rules to address changing regulatory environment.

The model can be reused across the KYC process and is not limited to local or product due diligence.

System 100 may include client data exchange module 130. Client data exchange module 130 may source data and documents from external data sources 175, such as Thomson Reuters, Swift KYC Registry, BvD Orbis, Markit Vantage, etc. as well as other internal sources.

In one embodiment, the documents sourced from internal data sources 170 and external data sources 175 may be uploaded into global document repository 180 and may be available for re-use across the organization.

In one embodiment, client data exchange module 130 may include one or more user interface to make the sourced data available to the users to pick the data for use and validate that data.

In one embodiment, client data exchange module 130 may expose a client-agnostic message so that any client can consume the message and populate the data into the client's systems. In one embodiment, a generic API may be used to distribute the data to the clients or requestors.

System 100 may include document digitization module 140. Document digitization module 140 may be a module that digitizes and extracts data from structured (e.g., passports, driving licenses, other forms of government issued identification, etc.) and unstructured documents (e.g., annual reports, financial statements, legal agreements, etc.).

In one embodiment, users may be able to review and correct data based on the confidence level of extraction shown by the application. In one embodiment, the confidence level of data extraction may be based, for example, on a ratio of successful characters recognized to the total number of characters in a word.

In one embodiment, machine learning may be used to train document digitization module 140 based on the observations and corrections made by the user.

In one embodiment, data extracted from structured and unstructured documents may be stored as extended metadata in global document repository 180 making it available for reuse across the organization.

System 100 may further include narrative generation module 150. Narrative generation module 150 may provide user configurable narrative generation for fields on the KYC record that require the user to review multiple data points residing within and outside of the application.

For example, an example narration may include the type of customer (e.g., a low risk large privately held operating company), where it is located or has a has significant operations (e.g., domiciled in United States), the customer's primary business (e.g., engaged in Offices Of Real Estate Agents And Brokers), etc.

In one embodiment, multiple templates may be specified by the users for each sentence needed as a part of the paragraph, which may contain multiple sentences. Paragraphs may be generated using randomization of templates. The templates may have a number placeholder for field values needed for narrative generation.

For example, the narrative may be re-generated automatically when the field values change to keep the data in sync.

System 100 may further include user interface 190, which may interface with, for example, server 110.

Figure 2:
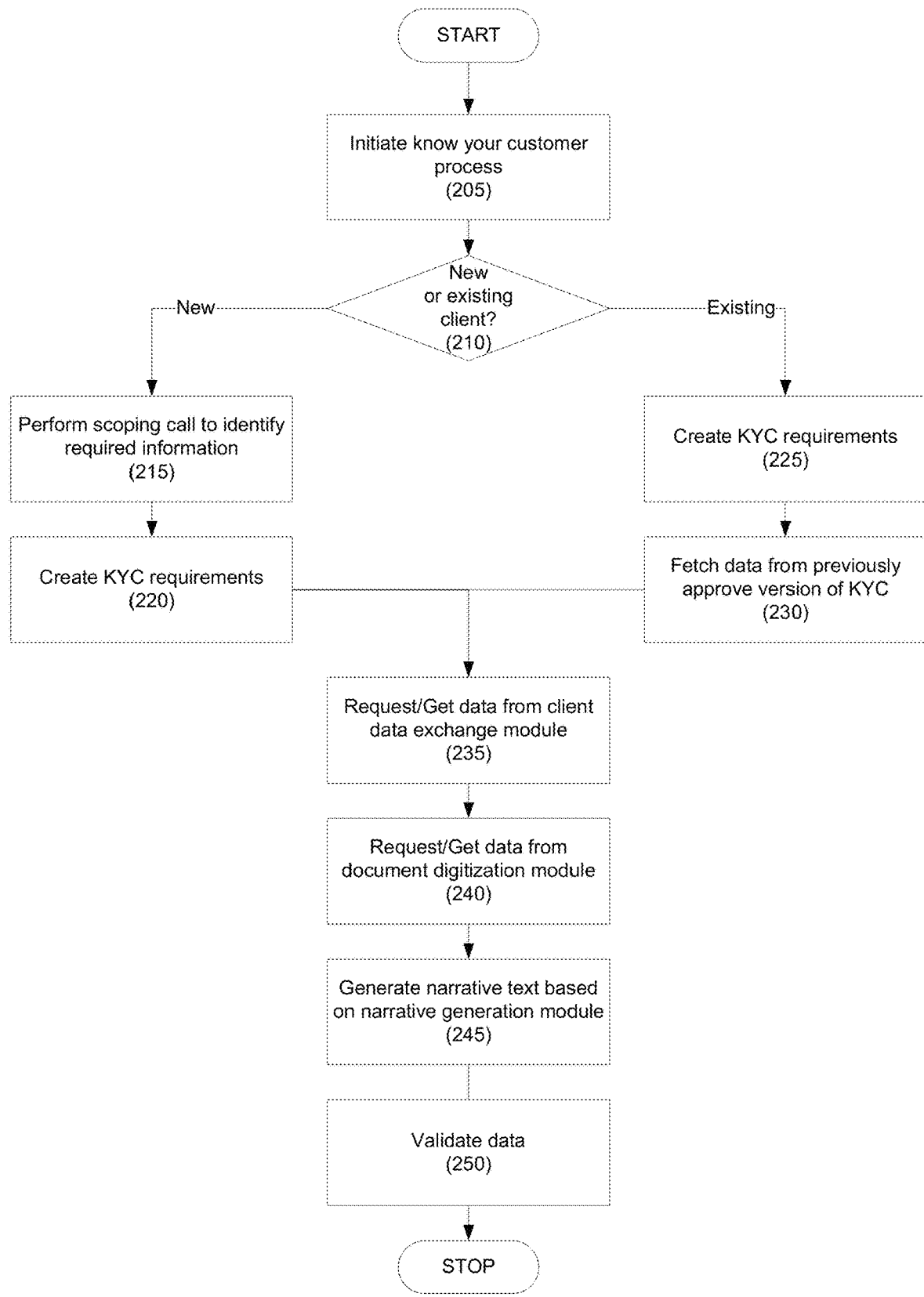
FIG. 2 depicts an automated know your customer process according to one embodiment.

Referring to FIG. 2, an automated know your customer process is disclosed according to one embodiment.

In step 205, a know your customer, or KYC, process may be initiated for an existing or a new client. In one embodiment, the KYC process may be initiated manually; in another embodiment, the KYC process may be automated with, for example, a manual backup.

The KYC process may require identifying information for the client (e.g., client name, address, tax ID, contact(s), etc.). The KYC process may further identify the product and services the relationship is being set up for, any global identifiers like LEI, AVID, etc.

In step 210, a check may made to see if the client is a new client or an existing client by, for example, checking organizational databases, receiving a manual entry, etc. If the client is a new client, in step 215, the data requirements for the new client may be identified. In one embodiment, a scoping call may be performed to identify these requirements.

In one embodiment, the source may be a user admin tool that has a catalog of all the rules/requirements and the trigger conditions. For example, if the client is a bank, then the system will ask if the bank is regulated, etc. The rules may be maintained in the catalog, and if the new client is a bank then the scoping call will return the requirement(s).

In step 220, the KYC requirements may be created based on user configurable requirements and a rules engine.

Figure 3:
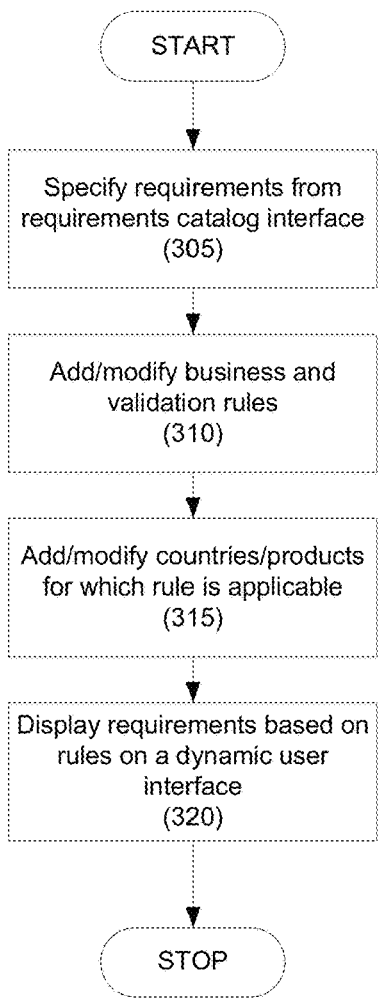
FIG. 3 depicts a method of creating KYC requirements based on user configurable requirements and a rules engine according to one embodiment.

Referring to FIG. 3, a method of creating KYC requirements based on user configurable requirements and a rules engine is disclosed according to one embodiment.

In step 305, the user may specify KYC requirements in a user interface.

In step 310, the user may add or modify business and validation rules for the KYC requirements in a decision table. In one embodiment, the decision table may be a part of the rules engine, where the country/regulator specific rules are housed. This may be based, for example, on country specific laws, regulations, etc. Each country and the regulators in the country may have specific requirements for KYC, and that will be maintained in a decision table. For example, for China, the business license of the client may be captured.

In step 315, the user may add or modify countries or products for the rule. In one embodiment, the user's admin tool may allow the user to configure the same rule for multiple countries so that there is only one entry in the catalog. For example, once the business license is a requirement in the catalog for China, it may be triggered for other countries as necessary and/or desired.

In step 320, the KYC requirements may be determined by a backend and displayed for the user in, for example, a user interface. In one embodiment, the KYC requirements may be used to pre-populate fields.

Referring again to FIG. 2, If the client is an existing client, in step 225, the KYC requirements may be created based on user configurable requirements and a rules engine. This may be similar to step 220, above.

In step 230, for an existing client, data from one or more prior approved KYC process may be retrieved. For example, the prior approved KYC process may be retrieved from a database.

In step 235, for both new and existing clients, client data may be requested from, for example, a client data exchange module. Additional details are provided in FIG. 4.

Figure 4:
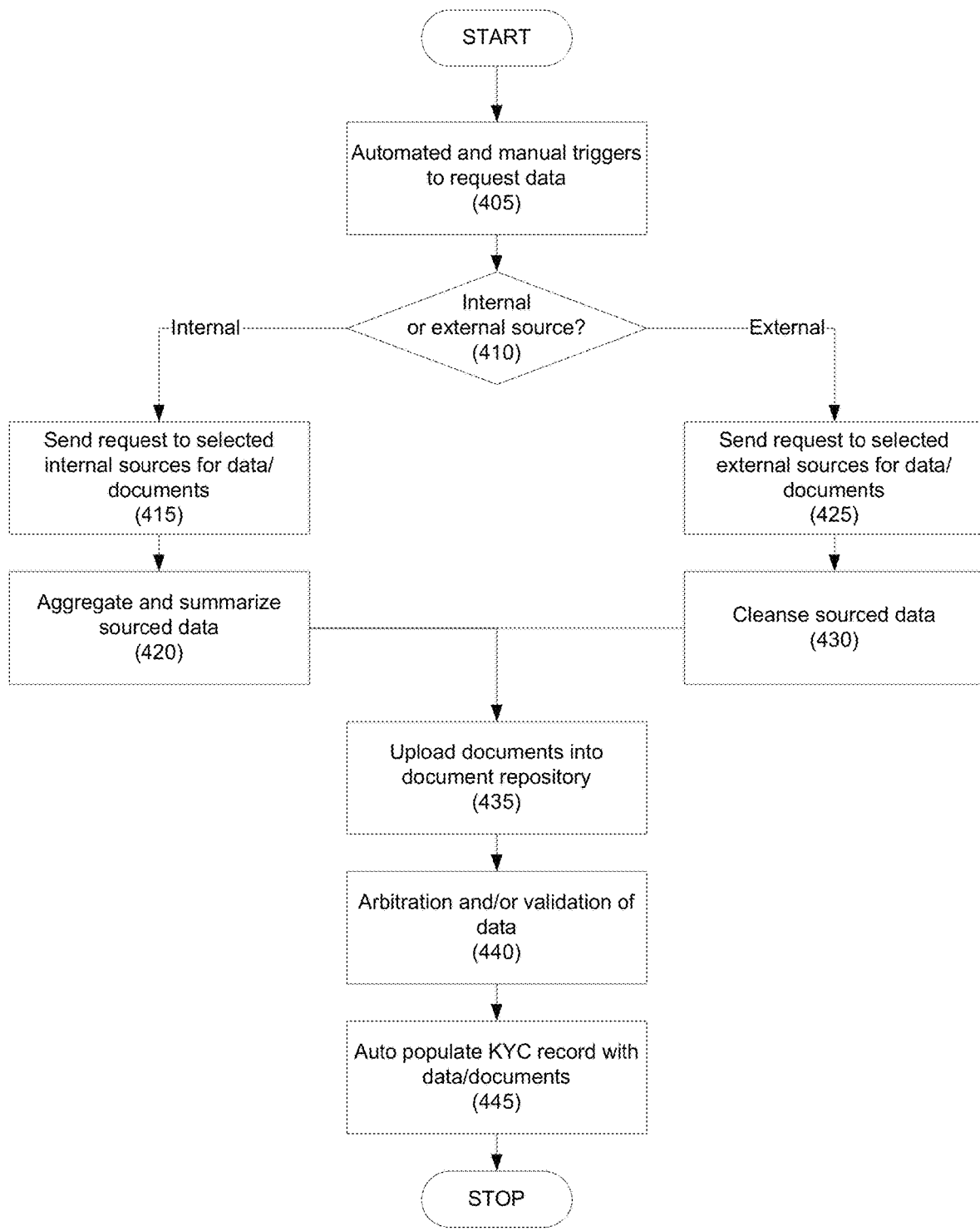
FIG. 4 depicts a method for the automated ingestion of client data and documents from internal and external sources according to one embodiment.

Referring to FIG. 4, a method for the automated ingestion of client data and documents from internal and external sources is disclosed according to one embodiment.

In step 405, an automated or manual trigger may be received to request data.

In step 405, a check may be made to determine if the KYC data for the client or for a related part of the client is from an internal source (e.g., a system or record, a database, etc. within an organization) or an external source (e.g., external market utilities). If the KYC data is from an internal source, in step 415, KYC data request(s) may be sent to the internal source(s) for KYC data and/or documents, and in step 420, the retrieved KYC data may be aggregated and summarized.

In one embodiment, transaction data may be aggregated to roll up from an account level to a client level, and a summary may be provided at rolled-up level.

If the KYC data is from an external source, in step 425, KYC data may be requested from the external sources (e.g., market utilities), such as Thomson Reuters, Swift KYC Registry, BvD Orbis, Markit Vantage, etc. for KYC data and/or documents.

In one embodiment, only entity identifiers will be included in the request. Privacy concerns may be addressed by data in transit and at-rest encryption, and also by contract with the third party market utility in question.

In step 430, the KYC data retrieved from the external data sources may be cleansed and may be mapped to globally accepted standards. Examples of globally accepted standards include the ISO country code and currency code. Data may be cleansed and standardized (e.g., using standard addresses). In addition, invalid data may be rejected for the provider to fix.

In step 435, the KYC data may be ingested into, for example, the organization's document repository. In one embodiment, the documents may be aggregated into a single source, and duplicate documents may be purged using, for example, ICR/OCR.

In step 440, the user may be presented with any conflicting KYC data for arbitration and/or validation. For example, if KYC data from different sources conflicts, the may be presented with the conflicting data for resolution.

In step 445, the KYC records may be automatically populated with information from the KYC data and/or documents. In one embodiment, mapping tables, natural language processing (NLP), machine learning, or a combination may be used for fields that are narrative in nature. For example, mapping may be used for country of registration; NLP may be used to make inferences from media and news articles; and machine learning may be used to identify rules and patterns to make an inference, and self-learn in that process.

Figure 5:
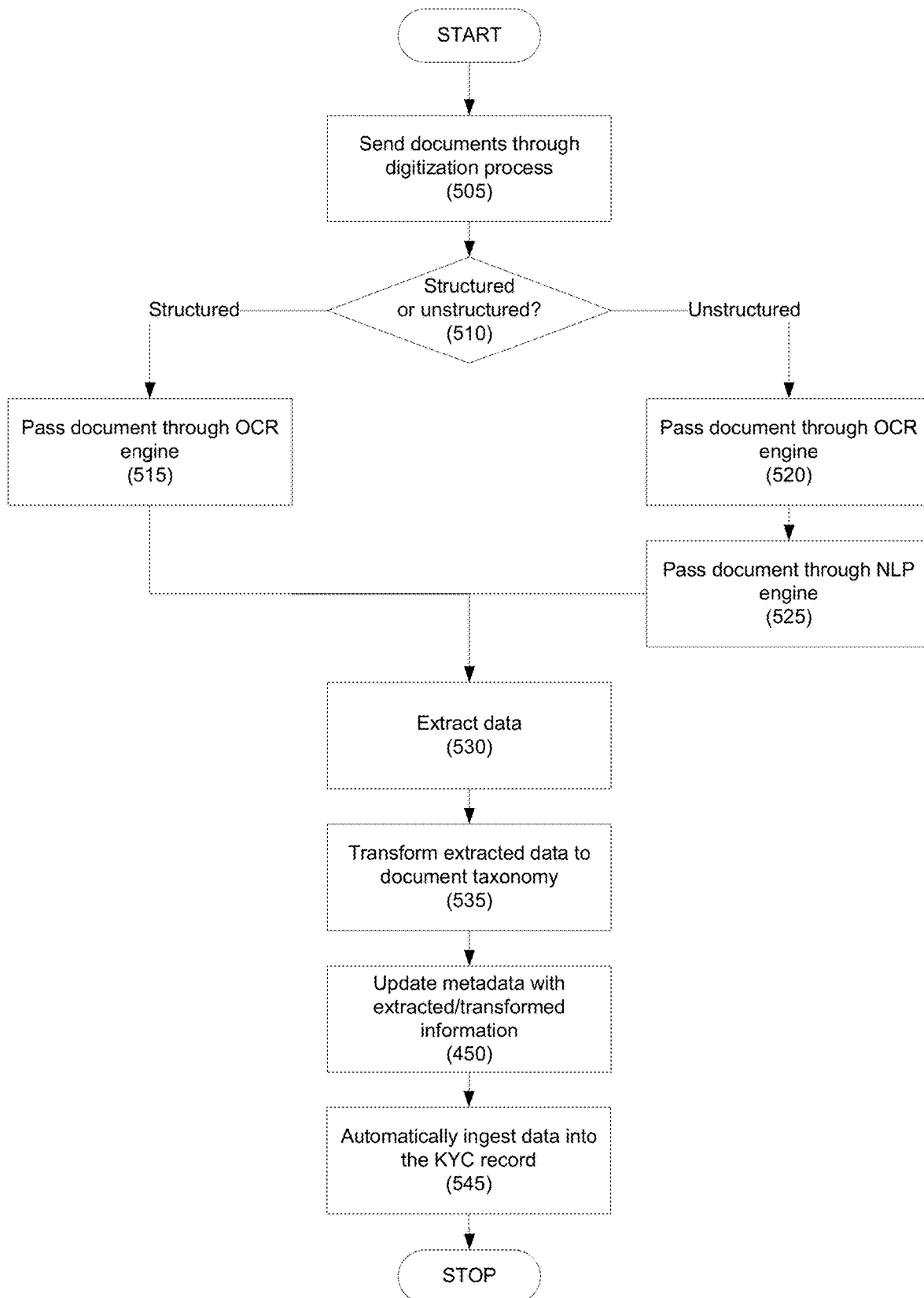
FIG. 5 depicts a method for document digitization and data extraction according to one embodiment.

Referring again to FIG. 2, in step 240, client data may be requested from a document digitization module. Referring to FIG. 5, a method for document digitization and data extraction is disclosed according to one embodiment.

In step 505, a document may be sent to the document digitization process. This may be initiated whenever a new document is received from an external source, when a user uploads a document that may have been received offline, etc.

In step 510, the document may be classified as a structured (e.g., a passport, driving license, other forms of government issued identification) or an unstructured (e.g., annual reports, financial statements, legal agreements, etc.) document.

For a structured document, in step 515, the document may be passed through an optical character recognition (OCR) engine. For an unstructured document, in step 520, the document may be passed through an OCR engine, and in step 525, the document may be passed through a natural language processing (NLP) engine. In one embodiment, the NLP engine takes descriptive text and extracts specific content and/or data points from the text. An example is deriving revenue information from descriptive text in a 10K.

In step 530, for both structured and unstructured documents, the data may be extracted, and, in step 535, the extracted data may be transformed to a document taxonomy. In one embodiment, the document taxonomy may define the fields used to store the extracted information. For example, total revenue is the field that will defined by document taxonomy, and the extracted data is stored against that field at a client level.

In step 540, metadata for the client in the global document repository may be updated with data from the extracted/transformed information.

In step 545, the extracted/transformed information may be automatically ingested into the KYC record for the client.

Figure 6:
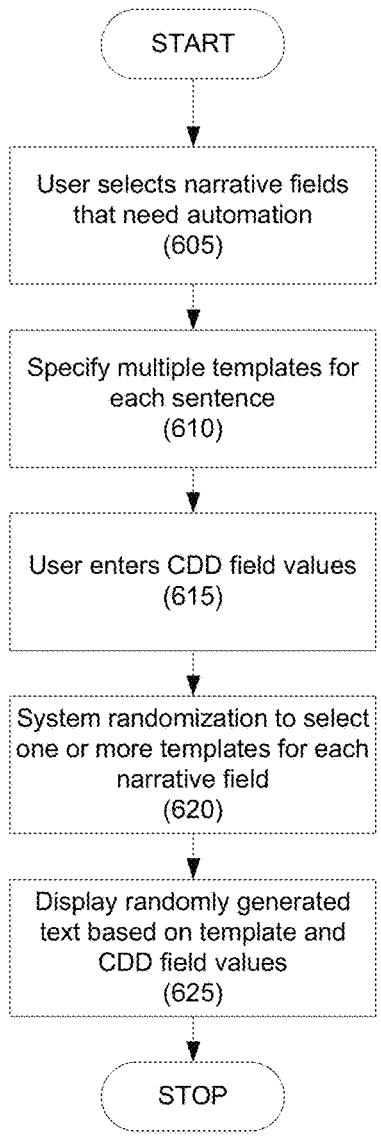
FIG. 6 depicts a method for the automated generation of narrative for text fields that need input from multiple KYC data sources according to one embodiment.

Referring again to FIG. 2, in step 245, narrative texts may be generated. Referring FIG. 6, a method for the automated generation of narrative for text fields that need input from multiple KYC data sources is disclosed according to one embodiment.

In step 605, a user may be presented with one or more narrative field that may be automated, and in step 610, the user may specify one or more template for each sentence in a narrative field.

In step 615, the user may enter the Customer Due Diligence (CDD) field values, and in step 620, the system may select a combination of multiple templates for each narrative field. For example, the system may select the templates randomly; in another embodiment, the system may rotate through the templates.

Each field in the template may have a plurality of fields.

In step 625, text may be randomly generated based on the templates and the CDD field values and may be presented to the user in the user interface. In one embodiment, the user may edit and/or modify the suggested narrative, or, if sufficient the user may keep as is.

Referring again to FIG. 2, in step 250, the front office may validate the collected data and address any gaps in the data and/or documents collected from the already available data (e.g., step 230), data integration (e.g., step 235), data extraction from documents using ICR/OCR (e.g., digitization step 240), and narrative generation (e.g., step 245), etc. Users may send this delta to front office and clients for them to respond via a user friendly mobile screen which may ingest the data directly into the KYC record.

In one embodiment, the front office may also approve the record when its full and final to ensure all the necessary information has been rightfully captured and approve the record.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, objective C, Swift, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for collecting and validating Know Your Customer data required under Financial Industry Regulatory Authority Rule 2090, for the purpose of client onboarding, comprising:
   in an information processing apparatus comprising at least one computer processor:
      creating Know Your Customer requirements and trigger conditions for a client based on user configurable requirements and a rules engine, the creating comprising:
         receiving a plurality of requirements configured from a requirements catalog interface;
         modify, via the rules engine, one or more Know Your Customer rules based on a set of factors comprising the client's country and one or more specific regulations for the client's country;
         determining, via a backend and based on the plurality of requirements and the modified one or more Know Your Customer rules, the Know Your Customer requirements;
      receiving Know Your Customer data for the client from a client data exchange module;
      triggering the receipt of additional Know Your Customer data in response to a trigger condition being met by the received Know Your Customer data;
      receiving document data from a document digitization module;
      validating the Know Your Customer data and the document data; and
      auto populating a Know Your Customer record with the validated Know Your Customer data and the document data.

2. The method of claim 1, further comprising:
   identifying one or more missing pieces of Know Your Customer data based on the Know Your Customer requirements.

3. The method of claim 1, wherein the step of creating Know Your Customer requirements for the client based on user configurable requirements and a rules engine comprises:
   receiving the Know Your Customer requirements from a user interface;
   receiving a plurality of rules for the Know Your Customer requirements; and
   receiving a modification of a country or product for one of the rules.

4. The method of claim 1, wherein the step of receiving the Know Your Customer data from a client data exchange module comprises:
   requesting the Know Your Customer data from a source internal to the client's organization wherein the internal source comprises one or more of a system of record within the client's organization and a database within the client's organization; and
   receiving and ingesting the Know Your Customer data from the source internal to the client's organization.

5. The method of claim 1, wherein the step of receiving Know Your Customer data from a client data exchange module comprises:
   requesting the Know Your Customer data from a source external to the client's organization wherein the external source comprises one or more market utilities not controlled or maintained by the client's organization;
   receiving the Know Your Customer data from the source external to the client's organization; and
   mapping the Know Your Customer data to a globally accepted standard format.

6. The method of claim 5, wherein the globally accepted standard format is based on ISO country code or currency code.

7. The method of claim 1, wherein the step of receiving document data from a document digitization module comprises:
   classifying a document comprising the document data as a structured document or an unstructured document;
   recognizing characters in the document using an optical character recognition engine;
   extracting content from text in the unstructured document or identifying content in the structured document;
   transforming the content into a document taxonomy; and
   updating a metadata repository with the transformed content.

8. The method of claim 1, further comprising:
   generating a narrative text for the Know Your Customer data and the document data, comprising:
   receiving an identification of a template for the narrative text;
   receiving customer due diligence field values; and
   generating text based on the templates and the customer due diligence field values.

9. The method of claim 1, further comprising performing a scoping call to identify required customer data to be captured for the Know Your Customer requirements.

10. A system for collecting and validating Know Your Customer data required under Financial Industry Regulatory Authority Rule 2090, for the purpose of client onboarding, comprising:
    an electronic device comprising at least one computer processor and executing a client onboarding computer program;
    a user-configurable rules engine;
    a client data exchange module;
    a document digitization module; and
    a document repository;

wherein:
  the client onboarding computer program creates Know Your Customer requirements and trigger conditions for a client based on user configurable requirements from the user-configurable rules engine, the creating comprising:
    receiving a plurality of requirements configured from a requirements catalog interface;
    modify, via the rules engine, one or more Know Your Customer rules based on a set of factors comprising the client's country and one or more specific regulations for the client's country;
    determining, via a backend and based on the plurality of requirements and the modified one or more Know Your Customer rules, the Know Your Customer requirements;
  the client onboarding computer program receives Know Your Customer data for the client from the client data exchange module;
  the client onboarding computer program triggers the receipt of additional Know Your Customer data in response to a trigger condition being met by the received Know Your Customer data;
  the client onboarding computer program receives document data from the document digitization module;
  the client onboarding computer program validates the Know Your Customer data and the document data; and
  the client onboarding computer program auto populates a Know Your Customer record with the validated Know Your Customer data and the document data.

11. The system of claim 10, wherein the client onboarding computer program identifies one or more missing pieces of Know Your Customer data based on the Know Your Customer requirements.

12. The system of claim 10, wherein the client onboarding computer program creates the Know Your Customer requirements for the client by receiving the Know Your Customer requirements from a user interface, receiving a plurality of rules for the Know Your Customer requirements, and receiving a modification of a country or product for one of the rules.

13. The system of claim 10, wherein the client onboarding computer program receives the Know Your Customer data from a client data exchange module by requesting the Know Your Customer data from a source internal to the client's organization and receiving and ingesting the Know Your Customer data from the source internal to the client's organization, wherein the internal source comprises one or more of a system of record within the client's organization and a database within the client's organization.

14. The system of claim 10, wherein the client onboarding computer program receives the Know Your Customer data from a client data exchange module by:
  requesting the Know Your Customer data from a source external to the client's organization wherein the external source comprises one or more market utilities not controlled or maintained by the client's organization;
  receiving the Know Your Customer data from the source external to the client's organization; and
  mapping the Know Your Customer data to a globally accepted standard format.

15. The system of claim 14, wherein the globally accepted standard format is based on ISO country code or currency code.

16. The system of claim 10, wherein the client onboarding computer program receiving document data from a document digitization module by:
  classifying a document comprising the document data as a structured document or an unstructured document;
  recognizing characters in the document using an optical character recognition engine;
  extracting content from text in the unstructured document or identifying content in the structured document;
  transforming the content into a document taxonomy; and
  updating a metadata repository with the transformed content.

17. The system of claim 10, wherein the client onboarding computer program further generates a narrative text for the Know Your Customer data and the document data by:
  receiving an identification of a template for the narrative text;
  receiving customer due diligence field values; and
  generating text based on the templates and the customer due diligence field values.

18. The system of claim 10, wherein the client onboarding computer program performs a scoping call to identify required customer data to be captured for the Know Your Customer requirements.

* * * * *